Feb. 11, 1941.    R. G. ROESCH    2,231,415
ERASER AND METHOD OF MAKING THE SAME
Filed Aug. 3, 1940
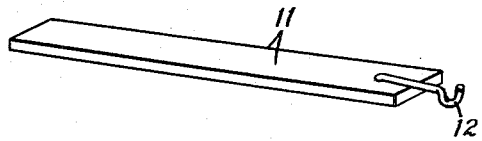
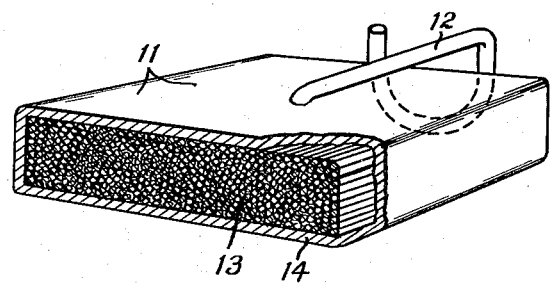
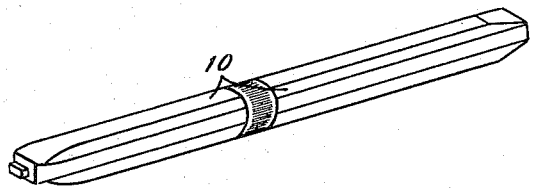
INVENTOR
RUDOLPH GEORGE ROESCH
BY *Theodore L. Simonton*
ATTORNEY Patented Feb. 11, 1941

2,231,415

UNITED STATES PATENT OFFICE 2,231,415

ERASER AND METHOD OF MAKING THE SAME

Rudolph George Roesch, Syracuse, N. Y., assignor to The Eraser Company, Inc., Syracuse, N. Y., a corporation of New York Application August 3, 1940, Serial No. 350,765

8 Claims. (Cl. 120—36)

In my copending application Serial No. 175,867, filed November 22, 1937, I have disclosed and claimed a method of making erasers composed of a bundle of glass filaments or fibres bound and held together by a binding agent which is applied in liquid form to the bundle and dried to form a thin coating thereon. The preferred binding agent is an aqueous dispersion of prevulcanized rubber sold under the trade-mark "Vultex." As manufactured the individual erasers are cylindrical in form, and are intended to be used in an eraser holder such as disclosed in my said copending application, having an eraser housing provided with a cylindrical bore to receive the erasing element, which bore has a rectangular outlet through which the end of the erasing element projects.

It will be apparent that for such service the binder coating must be thin and of such character as to permit the bundle of glass fibres to spread out and flatten as the erasing element is fed through the rectangular outlet.

The glass fibre eraser of my said copending application has excellent abrasive qualities and has been found to do a superior job of erasing ink and typewriter ribbon copies. While this glass fibre eraser is much safer to use and handle than the cylindrical bundles of loose glass fibres heretofore used as erasers, it is possible to spread the glass fibres apart and run some of them into the fingers if the refill is handled carelessly, as may be done, for example, by school children, while loading and unloading an eraser holder. Moreover, if the debris left after erasing be carelessly brushed away with the hand, it is possible to get tiny particles of broken glass into the skin in such a manner as to cause discomfort to the user.

The primary object of the present invention is to provide a glass fibre erasing element or eraser refill of such construction as to retain all the advantages of the glass fibre eraser of my said copending application while avoiding wholly or in large part the disadvantages mentioned above.

Other objects and advantages will become apparent from the following specification in conjunction with the accompanying drawing, in which:

Figure 1 is a perspective view of an eraser refill made in accordance with my invention, and adapted for use in a holder.

Figure 2 is a section, part being broken away, taken on the line 2—2 of Figure 1, showing the glass filaments greatly enlarged.

Figure 3 is a perspective view of an eraser holder adapted to utilize the eraser refill illustrated in Figure 1.

Referring more particularly to the drawing, the eraser holder 10 shown in Figure 3 may be constructed as disclosed in my said copending application Serial No. 175,867, since matured into Patent No. 2,210,432, August 6, 1940, but is preferably constructed as disclosed in my later copending application Serial No. 350,768, filed August 3, 1940, the external appearance and the general features being the same in either case. As far as the present invention is concerned, it is sufficient to say that the eraser holder 10 contains a propelling mechanism adapted to feed the erasing element through the rectangular outlet as illustrated at the left of Figure 3.

Figure 1 shows in perspective an erasing element or refill 11 constructed in accordance with the present invention and adapted for use in the eraser holder 10. The eraser 11 is provided with a wire connector 12 for releasably connecting the eraser 11 to the propelling mechanism of the holder 10. The connector 12 is described in more detail in my said later application Serial No. 350,766.

The eraser 11 is preferably a relatively long, thin oblong, and comprises a bundle of glass filaments or fibres 13 enclosed in a casing 14 made of rubber of suitable characteristics. The primary purposes of the casing 14 are to hold and enclose the glass fibres 13 in such manner as to prevent individual fibres from being separated from the bundle and to provide safe side surfaces for contact with the user's hands. In order to fulfill these objects, the casing 14 must be reasonably thick and dense so as to impart to and maintain a definite shape for the eraser. At the same time, the rubber casing 14 must be of such character as to wear away as the eraser is used without producing a smear and without impairing the erasing efficiency of the glass fibres. Preferably also, the casing 14 should wear away in the form of crumbs capable of picking up and retaining the tiny particles of glass broken from the glass fibres during the erasing operation. In the ideal situation, of course, the rubber casing 14 would itself have desirable erasing qualities.

A satisfactory material for the rubber casing 14 is a "Vultex" compound of the general character described above and used as the binding agent in making fibre glass erasers as described in my application Serial No. 175,867. The "Vultex" coating compounds are available on the market in a number of different formulas intended for specialized purposes. These "Vultex" compounds require no vulcanizing but set simply by air drying, and the rubber coating produced after drying is not tacky and does not require dusting with talcum, mica or other dusting agent, as do the rubber films produced by drying most rubber solutions if a tacky feel is to be avoided. For the purposes of the present invention, the "Vultex" compound to be chosen should be heavier and thicker, and should form a coating of less flexibility and stretch than is true in the case of my earlier process. Moreover, in order to improve the erasing qualities of the coating and cause it to wear away properly in service, I have found it desirable to mix with the "Vultex" compound a small amount of a finely divided abrasive such as powdered pumice. With such a "Vultex"- abrasive coating compound, the casing 14 may be formed by simply dipping a bundle of glass fibres in the mixture, forming to the desired shape and then drying.

Spun glass fibres are commercially obtainable in long skeins. For the present invention, I prefer a skein containing about 2000 filaments each having a diameter of from two to two and one-half thousandths of an inch. For convenience of handling the skein is preferably cut up into lengths of from four to five feet. The long bundles of glass fibres thus obtained are passed through a bath of thin "Vultex" compound, preferably in spaced apart relationship so as to be thoroughly impregnated, then shaped to the desired rectangular form, and hung up to dry and set. The shaping may be done by the use of grooved rollers or by drawing the bundle through a die, in either case while the "Vultex" is at least semi-liquid. These preliminary steps closely resemble the process of my application Serial No. 175,867, and result in the production of a bundle of glass fibres bound and held together in the desired oblong shape.

The oblong bundle so made is then dipped in the heavier "Vultex" compound containing pumice or the like as described above, thus coating the casing 14 on the bundle. After drying, the bundle may be severed into pieces of appropriate length for the eraser refills, and a wire connector 12 attached to each piece as described in my later application Serial No. 350,766. Since the two coating compounds are essentially of the same composition, they adhere firmly to one another, forming a compact unit.

It will be evident that the oblong bundle could be severed into eraser lengths before dipping into the "Vultex"-abrasive mix, in which event the casing 14 would cover the ends of the refills as well as their sides.

It is possible also to dispense with the preliminary coating, by dipping the bundle of loose glass fibres directly into the "Vultex"-abrasive mix, followed by shaping and drying. I prefer, however, to employ the two dip process described above, as by so doing the finished erasers may more readily be maintained within fairly exact size limits while at the same time ensuring a uniform thickness of the casing 14 and adequate coverage of all the glass fibres.

Various changes and modifications may suggest themselves to those skilled in the art without departing from the spirit of my invention and I therefore desire to be limited only by the scope of the appended claims.

I claim:

1. A rubber glass eraser comprising a bundle of glass fibres extending longitudinally of an eraser body, and a casing of rubber entirely surrounding said bundle of glass fibres along their length.

2. A rubber glass eraser comprising a bundle of glass fibres extending longitudinally of an eraser body, a binding material for binding said fibres together, and a casing of rubber entirely surrounding said bundle of glass fibres along their length.

3. A rubber glass eraser comprising a relatively long thin flat body portion, a mass of compactly arranged glass fibres extending longitudinally of said body portion for substantially the entire length thereof, and a casing of rubber extending the entire length of said eraser body and completely enclosing said glass filaments along said length.

4. A method of making rubber glass erasers comprising coating a quantity of minute glass filaments with an aqueous dispersion of prevulcanized rubber containing a finely divided abrasive material, and allowing said coating to set, thereby enclosing said glass filaments in a casing of rubber.

5. A method of making rubber glass erasers comprising coating a quantity of minute glass filaments with an aqueous dispersion of prevulcanized rubber containing a finely divided abrasive material, shaping said treated filaments to a desired form, and allowing said coating to set, thereby enclosing said glass filaments in a casing of rubber.

6. A method of making rubber glass erasers comprising passing a bundle of minute glass filaments of relatively long lengths through a binding compound of prevulcanized rubber in an aqueous dispersion, shaping said bundle into a desired form, allowing said binding compound to set, coating said shaped bundle with an aqueous dispersion of prevulcanized rubber containing a finely divided abrasive material, and allowing said coating to set, thereby enclosing said glass filaments in a casing of rubber.

7. A method of making rubber glass erasers comprising gathering a plurality of glass fibres into a bundle, treating said bundle with a compound characterized by its ability to wet said glass fibres and bind the same together, shaping said treated bundle, allowing said treating compound to set, and covering said shaped bundle with a rubber compound characterized by its affinity for said binding compound.

8. A method of making rubber glass erasers comprising gathering a plurality of glass filaments into a bundle, treating said bundle with a rubber compound which in its liquid form has an affinity for said glass fibres and which when dry binds the same together, shaping said treated bundle, allowing said treating compound to set, cutting said shaped bundle into pieces of suitable length, and encasing each piece with a rubber compound characterized by its affinity for said binding compound.

RUDOLPH GEORGE ROESCH.